UNITED STATES PATENT OFFICE.

EDUARD SPRÖNGERTS, OF FRANKFORT-ON-THE-MAIN, GERMANY, ASSIGNOR TO VEREINIGTE CHININFABRIKEN ZIMMER & CO., G. M. B. H., OF FRANKFORT-ON-THE-MAIN, GERMANY.

SANTALOL ESTERS.

No. 922,538.   Specification of Letters Patent.   Patented May 25, 1909.

Application filed July 29, 1908. Serial No. 445,976. (Specimens.)

*To all whom it may concern:*

Be it known that I, EDUARD SPRÖNGERTS, a subject of the German Emperor, and a resident of Frankfort-on-the-Main, Germany, have invented certain new and useful Improvements in Santalol Esters, of which the following is a specification.

The santalol esters hitherto known are entirely liquid and therefore present difficulties in dividing into doses and in taking. I have succeeded in producing a solid crystalline ester which is the santalol ester of the allophanic acid and has a definite melting point and is free from odor and taste and which can be dosed and taken in the form of powder. It can be obtained by the methods known for preparing allophanic acid esters by reacting with carbamine acid derivatives upon santalol. Some examples therefor are hereinafter given. The santalol ester of allophanic acid ($C_{15}H_{23}O-CO-NH-CO-NH_2$), having a contents of about 72 per cent. of santalol, crystallizes in fine white needles which melt at 162° centigrade. It has neither odor, nor taste, is soluble in most of the organic solvents, but insoluble in water. It is saponified by alcoholic potash lye, santalol being liberated. If it be heated above its melting point, santalol-like vapors are first produced and then vapors of cyanic acid having a pungent odor.

The following are examples of how this invention can be performed.

Example 1: Into santalol, or into solution of santalol in a suitable solvent, (such, for instance as petroleum-benzin) cyanic acid is slowly introduced. After a short time, the separation of the santalol ester of allophanic acid begins to take place. The introduction of cyanic acid is continued until no further thickening of the mass is observable. The mass is then exhausted by suction and is washed with petroleum-benzin which dissolves the new santalol ester with some difficulty. It is recrystallized from a mixture of benzene and petroleum-benzin. The reaction is expressed by the following equation:

$C_{15}H_{23}OH + 2HNCO =$
$\qquad C_{15}H_{23}O-CO-NH-CO-NH_2$

Example 2: To a solution of 1.59 kilograms of chlorid of urea (2 molecular proportions) in 11 kilograms of benzene are added, while the solution is being well cooled, 2.2 kilograms of santalol (1 molecular proportion). After the reaction product has been allowed to stand for a few hours, the benzene is distilled off. The semi-solid residue is ground with petroleum-benzin and the santalol ester of allophanic acid drawn off by suction and washed out and recrystallized from a mixture of benzene and petroleum-benzin. The reaction is as follows:

(1) $C_{15}H_{23}OH + ClCO.NH_2 =$
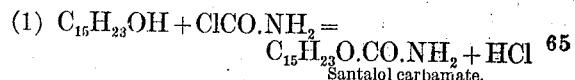
Santalol carbamate.

(2) $C_{15}H_{23}O.CO.NH_2 + ClCO.NH_2 =$
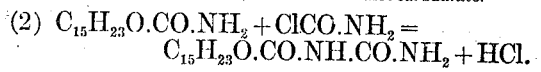

It is therefore also possible to first produce the santalol carbamate, which is a tasteless oil, and to obtain therefrom santalol allophanate by the action of chlorid of urea.

Example 3: 2.2 kilograms of santalol (1 molecular proportion) are mixed with 5 kilograms of benzene and 2.5 kilograms of di-methyl-anilin and to this mixture, while being well cooled, are added 1.59 kilograms of chlorid of urea (2 molecular proportions) an excess of chlorid being preferably used. After the mixture has been allowed to stand for several hours, it is filtered and the filtrate is washed with dilute sulfuric acid to remove any of the base still present. The benzene is then distilled off. There remains a semi-solid residue from which the santalol allophanate is isolated. In lieu of di-methyl-anilin, other tertiary bases which similarly enliven reactions, such, for instance, as pyridin, may be employed.

Example 4: 2.2 kilograms of santalol (1 molecular proportion) are heated for about four hours in a vacuum to from 140° to 145°, centigrade, with 2.74 kilograms phenol carbamate (2 molecular proportions), or preferably with an excess of the said carbamate, a small amount of caustic potash being added. The phenol distils off and there remains a solid residue, which is ground, washed with petroleum-benzin and recrystallized from benzene-benzin. The reaction is as follows:

$C_{15}H_{23}OH + 2C_6H_5-O-CO-NH_2 =$
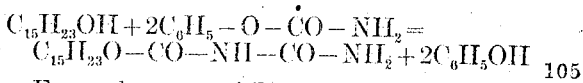

Example 5: 2.2 kilograms of santalol (1 molecular proportion) and 1.8 kilograms of phenol ester of allophanic acid (1 molecular proportion) are caused to react exactly as in the last preceding example and the product is treated in the same manner. The reaction is as follows:

$$C_{15}H_{23}OH + C_6H_5-O-CO-NH-CO-NH_2 = C_{15}H_{23}O-CO-NH-CO-NH_2 + C_6H_5OH$$

Example 6: 2.2 kilograms of santalol are dissolved in 6 kilograms of toluene and boiled for a few days with 0.23 kilograms of metallic sodium. The solution is decanted from any remaining sodium and while being well cooled is cautiously mixed with 2 kilograms of chlorid of urea. 10 kilograms of petroleum-benzin are added to the reaction mixture and the allophanate, which is formed after a few days, is drawn off by suction, and is evaporated and dried and the sodium chlorid still contained therein is washed out. The santalol allophanate is recrystallized from alcohol.

I claim:

1. The herein described process of producing santalol esters in a solid form which consists in reacting with a carbamin acid derivative upon santalol, substantially as described.

2. As an article of manufacture the santalol ester of allophanic acid yielding by saponification about 72 per cent. of santalol and having the formula, $$C_{15}H_{23}O-CO-NH-CO-NH_2,$$

crystallizing in fine white needles which melt at 162° centigrade, having neither odor nor taste and being soluble in most of the organic solvents, but insoluble in water.

In testimony whereof I have signed my name to this specification in the presence of two subscribing witnesses.

EDUARD SPRÖNGERTS.

Witnesses:
  JEAN GRUND,
  CARL GRUND.